US010018232B2

(12) United States Patent
Itagaki et al.

(10) Patent No.: US 10,018,232 B2
(45) Date of Patent: Jul. 10, 2018

(54) SELECTABLE ONE-WAY CLUTCH

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 150 days.

(21) Appl. No.: 15/091,972

(22) Filed: Apr. 6, 2016

(65) Prior Publication Data

US 2016/0298704 A1 Oct. 13, 2016

(30) Foreign Application Priority Data

Apr. 8, 2015 (JP) ................................ 2015-078999

(51) Int. Cl.

*F16D 41/12* (2006.01)
*F16D 23/12* (2006.01)
*F16D 27/10* (2006.01)
*F16D 41/08* (2006.01)
(Continued)

(52) U.S. Cl.

CPC .......... *F16D 41/125* (2013.01); *F16D 23/12* (2013.01); *F16D 27/10* (2013.01); *F16D 28/00* (2013.01); *F16D 41/08* (2013.01); *F16D 41/084* (2013.01); *F16D 41/12* (2013.01); *F16D 41/14* (2013.01); *F16D 2023/126* (2013.01)

(58) Field of Classification Search

CPC ........ F16D 41/125; F16D 23/12; F16D 27/10; F16D 28/00; F16D 2023/126
See application file for complete search history.

(56) References Cited

U.S. PATENT DOCUMENTS 7,296,670 B2 * 11/2007 Howard .................... F16D 9/02 192/144
8,622,186 B2 * 1/2014 Samie ..................... F16H 57/08 192/43.1
9,377,061 B2 * 6/2016 Kimes .................. F16D 41/125
(Continued)

FOREIGN PATENT DOCUMENTS

JP 2002-514292 A 5/2002
JP 2008-082478 A 4/2008
(Continued)

*Primary Examiner* — Stacey Fluhart
(74) *Attorney, Agent, or Firm* — Hunton Andrews Kurth LLP

(57) ABSTRACT

A selectable one-way clutch includes a first plate, a second plate, a claw, a selector plate and a plate driving device. The selector plate rotates relative to the first plate between a locked position and a released position. The plate driving device includes a drive arm, an actuator, a transmission mechanism, a stopper and a release mechanism. The actuator outputs a driving force to drive the selector plate via the drive arm. The transmission mechanism transmits the driving force to the drive arm such that the selector plate rotates from the released position to the locked position. The stopper is configured to move between a restricted position and an unrestricted position. The stopper is placed at the restricted position when the actuator is not operated. The release mechanism transmits the driving force to the stopper such that the stopper moves from the restricted position to the unrestricted position.

5 Claims, 7 Drawing Sheets

1

(51) Int. Cl.
*F16D 28/00* (2006.01)
*F16D 41/14* (2006.01)

(56) References Cited

U.S. PATENT DOCUMENTS

| | | | | |
|---|---|---|---|---|
| 2005/0117258 | A1 | 6/2005 | Ohta et al. | |
| 2005/0247535 | A1 | 11/2005 | Wynn | |
| 2013/0133449 | A1 | 5/2013 | Noma | |
| 2013/0199885 | A1 * | 8/2013 | Quehenberger | F16D 13/04 192/84.1 |
| 2014/0190785 | A1 * | 7/2014 | Fetting | F16D 41/00 192/41 R |
| 2016/0160942 | A1 | 6/2016 | Shioiri et al. | |

FOREIGN PATENT DOCUMENTS

| | | | |
|---|---|---|---|
| JP | 2012-517566 | A | 8/2012 |
| JP | 2013-112134 | A | 6/2013 |
| JP | 2016-109254 | A | 6/2016 |
| WO | 98/49456 | A1 | 11/1998 |
| WO | 2010/090958 | A1 | 8/2010 |

* cited by examiner 5A
34a
35
22
100
33
34
45
G1
25
46
47
42a
P1
100
23
42
32
100
31
4
30
21
36a
36
41
43
24
38
39
37
100

SELECTABLE ONE-WAY CLUTCH

INCORPORATION BY REFERENCE

The disclosure of Japanese Patent Application No. 2015-078999 filed on Apr. 8, 2015 including the specification, drawings and abstract is incorporated herein by reference in its entirety.

BACKGROUND

1. Technical Field

The disclosure relates to a selectable one-way clutch.

2. Description of Related Art

Published Japanese Translation of PCT Application No. 2002-514292 (JP-A-2002-514292) describes a selectable one-way clutch configured such that a plate including a claw provided in a projectable manner and a plate including a recessed portion with which the claw meshes are provided on the same axis, and a state of the claw is changed by a selector plate provided between two plates so as to select a lock mode and a release mode. The lock mode is a mode in which torque transmission between the two plates is allowed only at the time of a rotation in one predetermined direction. The release mode is a mode in which torque transmission between the two plates is blocked at the time of rotations in both directions. The selectable one-way clutch of JP-A-2002-514292 switches between the lock mode and the release mode by rotating the selector plate.

SUMMARY

In a case where the selectable one-way clutch is under an environment in which the selectable one-way clutch is immersed in gear oil, the selectable one-way clutch may be affected by a viscosity of the gear oil provided between the plate including the recessed portion and the selector plate. Particularly, in a case where a temperature of the gear oil is low, the viscosity of the gear oil becomes higher, so the selectable one-way clutch is easily affected by the viscosity. If the viscosity of the gear oil becomes higher, a shearing force of the gear oil provided between the plate including the recessed portion and the selector plate increases. Therefore, a torque that acts on the selector plate due to the rotation of the plate exceeds a torque that maintains the selector plate in the release mode, which may cause such a malfunction in which the selector plate rotates unexpectedly and the release mode is switched to the lock mode.

The disclosure provides a selectable one-way clutch that can prevent a malfunction in which a selector plate rotates unexpectedly.

An example aspect of the disclosure provides a selectable one-way clutch that includes a first plate, a second plate, a claw, a selector plate and a plate driving device. The second plate is placed on the same axis as the first plate. The claw is configured to project from the first plate toward the second plate. The claw is provided in the first plate. The claw is configured to mesh with a recessed portion in a case where the claw projects from the first plate only when the second plate rotates in one predetermined direction. The recessed portion is provided in the second plate. The selector plate is placed adjacent to the first plate. The selector plate is configured to rotate relative to the first plate between a locked position at which the claw projects from the first plate and a released position at which the claw is maintained to be accommodated on a first-plate-side. The plate driving device is configured to rotationally drive the selector plate. The plate driving device includes a drive arm, an actuator, a transmission mechanism, a stopper and a release mechanism. The drive arm extends from the selector plate. The actuator is configured to output a driving force to drive the selector plate via the drive arm at a time of operation. The transmission mechanism is configured to transmit, to the drive arm, the driving force output from the actuator, such that the selector plate rotates from the released position to the locked position. The stopper is configured to move between a restricted position at which a rotation of the selector plate from the released position to the locked position is restricted and an unrestricted position at which the restriction is released. The stopper is placed at the restricted position at a time of non-operation of the actuator. The release mechanism is configured to transmit, to the stopper, the driving force output at the time of operation of the actuator such that the stopper moves from the restricted position to the unrestricted position.

According to the above configuration, the stopper is placed at the restricted position at the time of non-operation of the actuator, so that a rotation of the selector plate from the released position to the locked position is restricted. Hereby, even in a case where the selectable one-way clutch is under an environment in which the selectable one-way clutch is immersed in gear oil and a torque of the second plate is transmitted to the selector plate via the gear oil at the time of non-operation of the actuator, the rotation of the selector plate is restricted by the stopper. Accordingly, it is possible to prevent a malfunction in which the selector plate rotates unexpectedly. Meanwhile, when the actuator operates, a driving force output at the time of the operation is transmitted to the stopper, so that the stopper moves from the restricted position to the unrestricted position. Accordingly, at the time when the selector plate rotates from the released position to the locked position by the transmission mechanism, the stopper moves to the unrestricted position, which does not disturb an intended rotational motion of the selector plate.

Further, since the selectable one-way clutch operates each of the selector plate and the stopper by means of the common actuator, it is possible to reduce the number of actuators in comparison with a case where an actuator for the operation of the selector plate and an actuator for the operation of the stopper are prepared separately, and it is also possible to reduce a drive energy for driving the actuator.

In the selectable one-way clutch, the drive arm may extend radially outwardly from the selector plate. The stopper may be configured to abut with the drive arm when the selector plate rotates in a direction from the released position toward the locked position and the stopper may be positioned at the restricted position. According to the above configuration, the drive arm extends outwardly in the radial direction of the selector plate, and when the drive arm abuts with the stopper, the rotation of the selector plate is restricted. On this account, a degree of freedom of the arrangement of each constituent improves because the transmission mechanism, the stopper, the release mechanism, and the like can be placed on an outer peripheral side of the selector plate.

The selectable one-way clutch may further include an interference prevention portion. The interference prevention portion may be provided in the drive arm. The interference prevention portion may be configured to prevent the stopper from interfering with a moving range of the drive arm when the stopper moves from the unrestricted position to the restricted position. According to the above configuration, even when the stopper is placed at the unrestricted position moves to the restricted position for some reasons, it is possible for the interference prevention portion provided in the drive arm to prevent the stopper from interfering with a moving range of the drive arm. Hereby, it is possible to prevent such an inconvenience that the stopper gets caught in the drive arm in a course of switching the selector plate from the locked position to the released position.

In the selectable one-way clutch, the transmission mechanism and the release mechanism may be each configured such that, when the operation of the actuator starts to operate, the driving force may be transmitted to the stopper so that the stopper moves to the unrestricted position, and then, the driving force is transmitted to the drive arm such that the drive arm operates. According to the above configuration, at the time when the rotation of the selector plate is started by the operation of the drive arm, the rotational restriction of the selector plate by the stopper is released in advance. Accordingly, it is possible to surely avoid such a problem that, at the time when the selector plate is intentionally rotated from the released position to the locked position by the operation of the actuator, the stopper disturbs the operation.

There is no special limitation on a mechanism for associating the operation of the stopper with the operation of the drive arm as described above. In the selectable one-way clutch, the actuator may include a drive rod. The drive rod may be configured to transmit the driving force. The transmission mechanism may be placed on an extended line of the drive rod via a gap. The transmission mechanism may include a transmission rod. The transmission rod may be configured to abut with the drive rod when the drive rod makes a stroke just by an amount corresponding to the gap, such that the transmission rod transmits the driving force to the drive arm. The release mechanism may include an intermediate mechanism. The intermediate mechanism may be provided between the drive rod and the stopper. The intermediate mechanism may be configured to transmit the driving force to the stopper when the drive rod makes the stroke. According to the above configuration, when the drive rod starts a stroke, a driving force is transmitted to the stopper via the intermediate mechanism provided between the drive rod and the stopper, and subsequently, after the stroke of the drive rod reaches a stroke corresponding to a gap, the driving force is transmitted to the drive arm. This makes it possible to associate the operation of the stopper with the operation of the drive arm as described above.

According to the configuration described above, the stopper is placed at the restricted position at the time of non-operation of the actuator, so that a rotation of the selector plate from the released position to the locked position is restricted. Hereby, even in a case where the selectable one-way clutch is under an environment in which the selectable one-way clutch is immersed in gear oil and a torque of the second plate is transmitted to the selector plate via the gear oil at the time of non-operation of the actuator, the rotation of the selector plate is restricted by the stopper. Accordingly, it is possible to prevent a malfunction in which the selector plate rotates unexpectedly.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
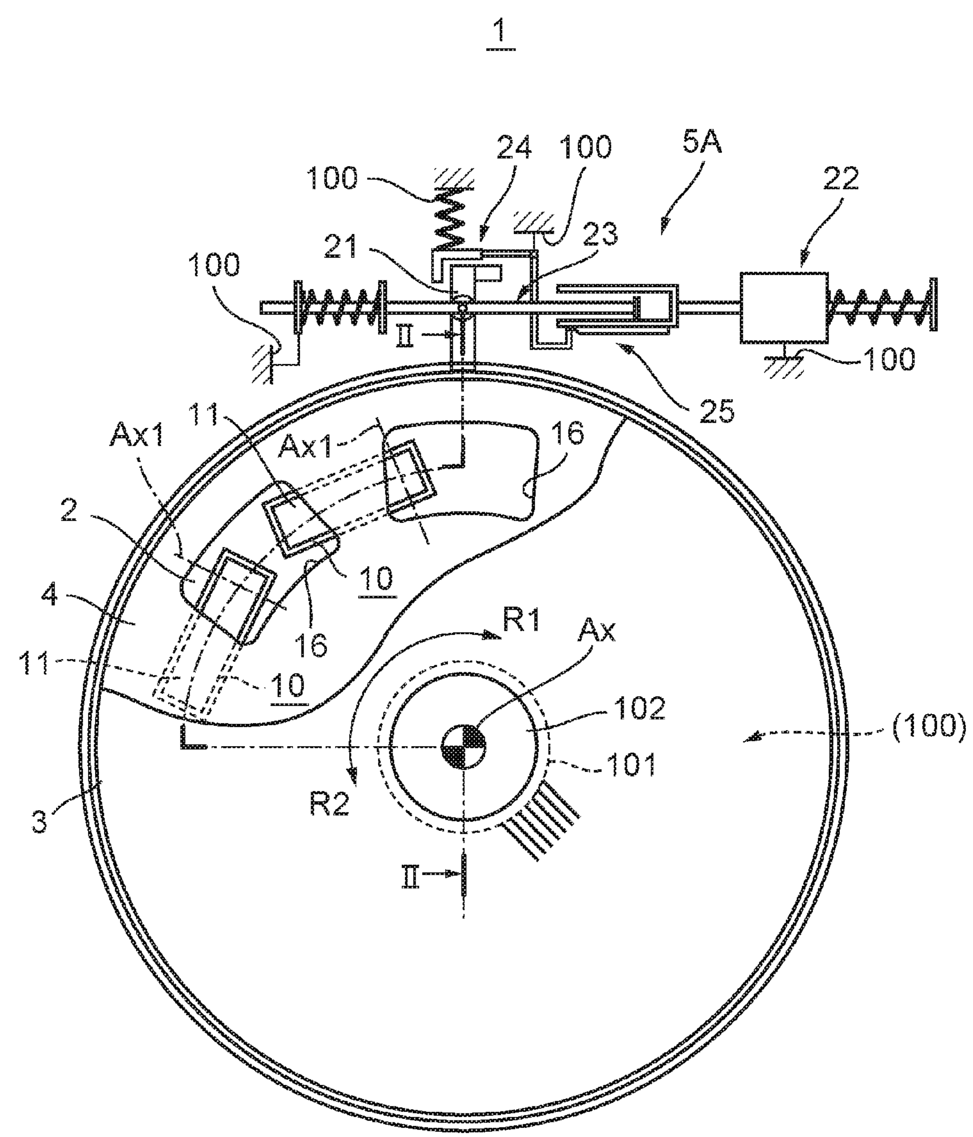
FIG. 1 is a view illustrating a selectable one-way clutch according to one embodiment.
Figure 2:
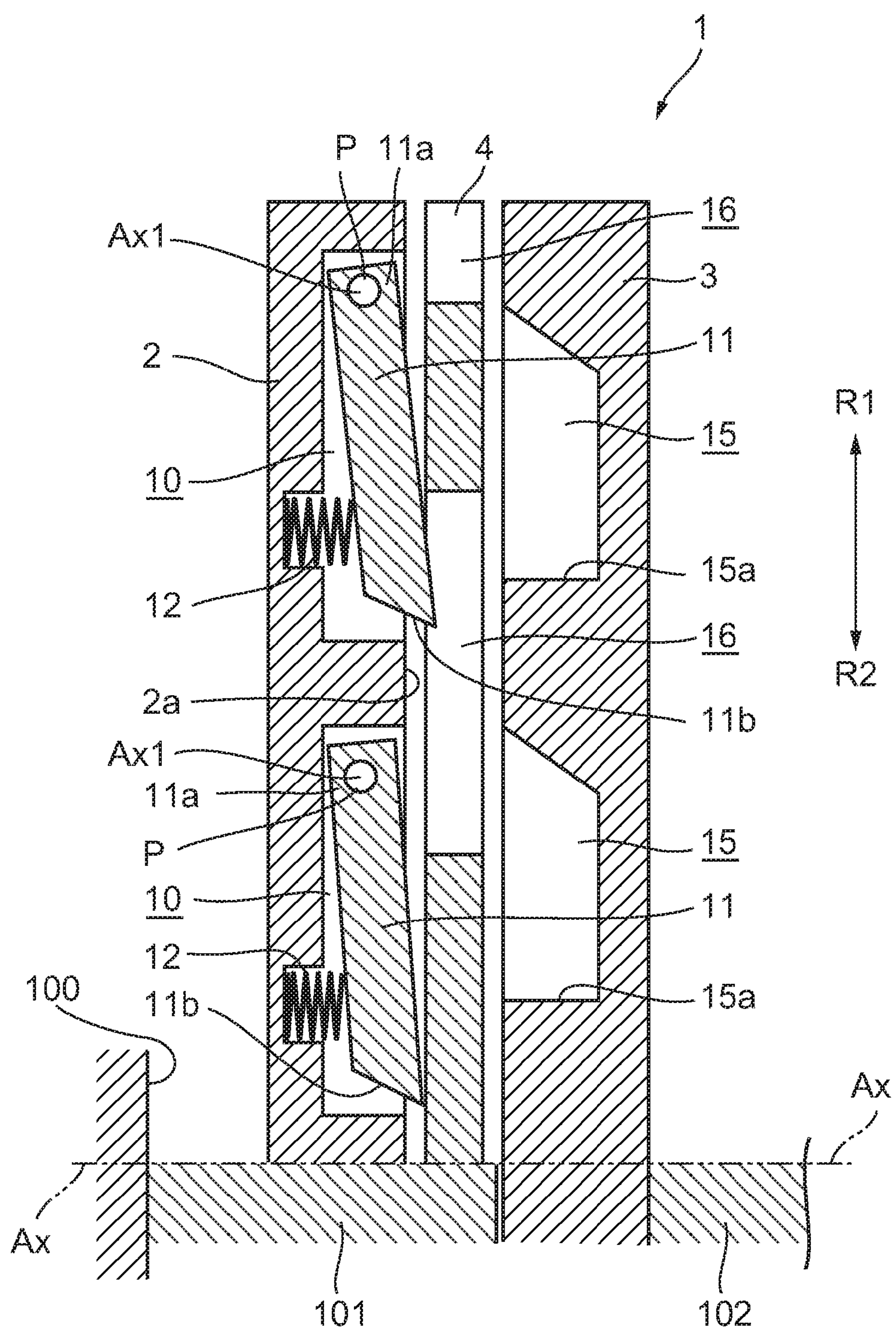
FIG. 2 is a sectional view at the time of a release mode, taken along a line II-II in FIG. 1.
Figure 3:
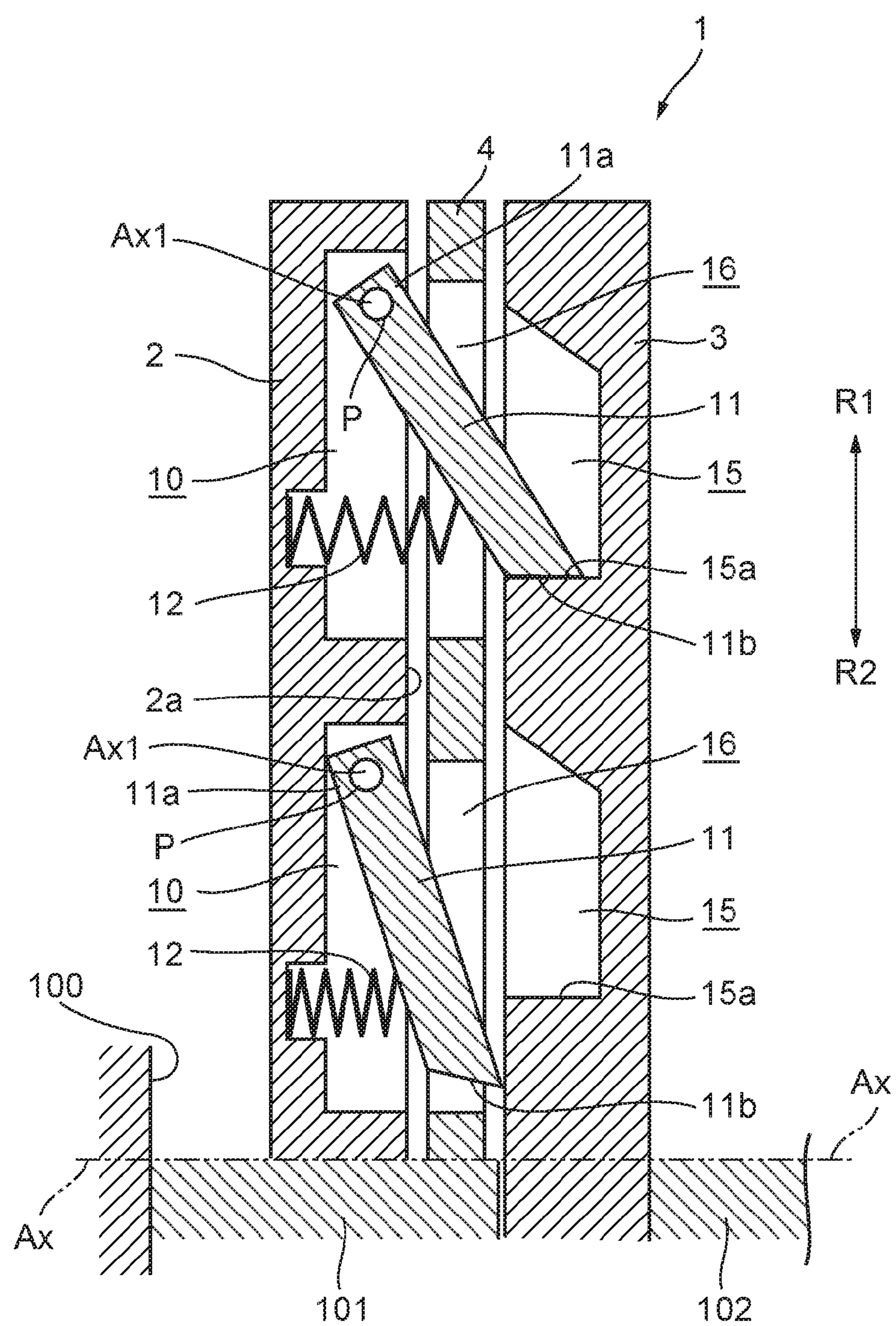
FIG. 3 is a sectional view at the time of a lock mode, taken along a line II-II in FIG. 1.
Figure 4:
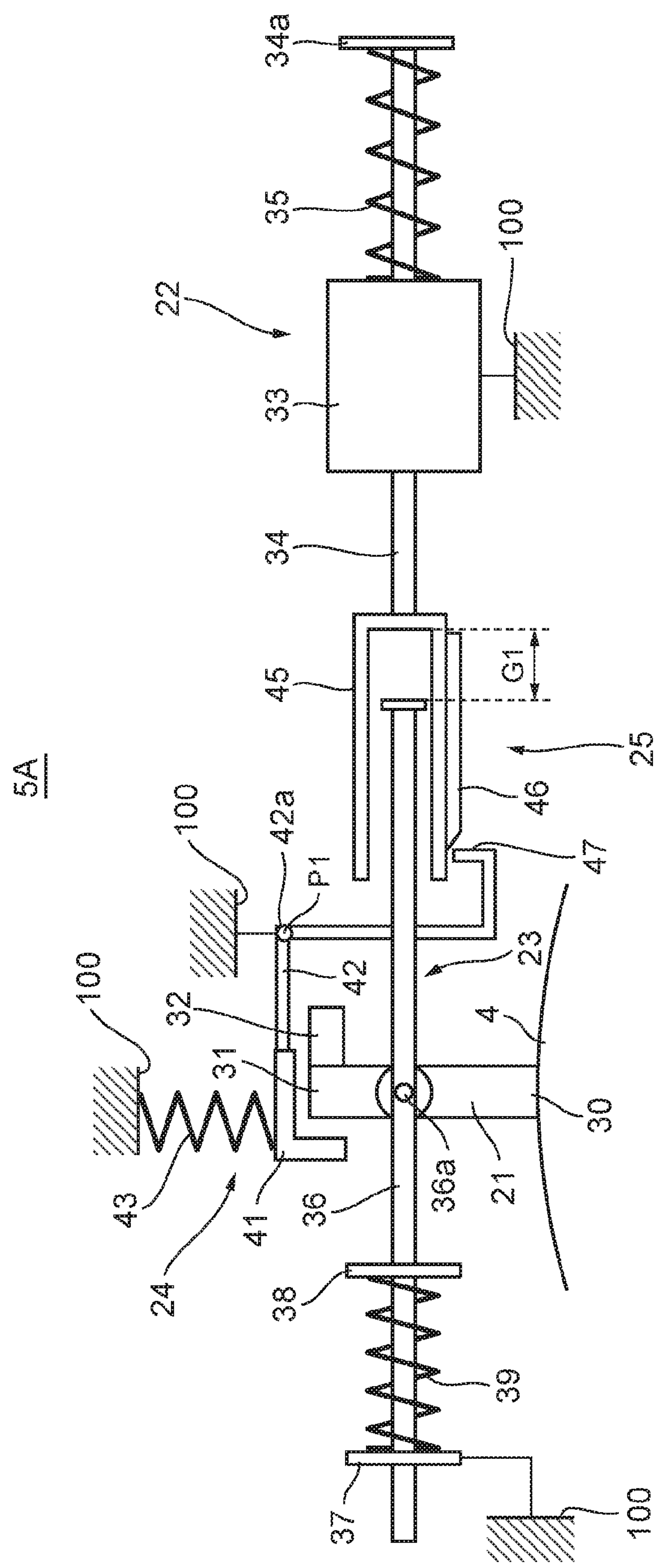
FIG. 4 is a view illustrating a plate driving device according to a first embodiment.

With reference to FIGS. 1 to 4 and FIGS. 5A to 5C, the following describes a first embodiment. A selectable one-way clutch (hereinafter referred to as a clutch) 1 illustrated in FIGS. 1 to 3 is incorporated into a hybrid transaxle (not shown). The clutch 1 is provided between a fixed shaft 101 fixed to a case 100 and a rotating shaft 102 rotatable around an axis Ax, which is the same axis as that of the fixed shaft 101. The clutch 1 can select an operation mode between a lock mode and a release mode. The lock mode is a mode in which the following states are switched to one another: a state where torque transmission from the rotating shaft 102 to the fixed shaft 101 is allowed so as to fix the rotating shaft 102 in a case where a rotation direction of the rotating shaft 102 is R1; and a state where the transmission torque from the rotating shaft 102 to the fixed shaft 101 is blocked so as to release the rotating shaft 102 in a case where the rotation direction is R2, which is reverse to the above. The release mode is a mode in which a state where torque transmission from the rotating shaft 102 to the fixed shaft 101 is blocked to release the rotating shaft 102 in either case where the rotation direction of the rotating shaft 102 is R1 or R2.

The clutch 1 includes: a holding plate 2 fixed to the fixed shaft 101; a rotating plate 3 provided so as to be rotatable around the axis Ax together with the rotating shaft 102 in an integrated manner; and a selector plate 4 placed between the holding plate 2 and the rotating plate 3 and provided so as to be rotatable around the axis Ax. The holding plate 2 is one example of a first plate. The rotating plate 3 is one example of a second plate.

In the holding plate 2, a plurality of holding chambers 10 is formed such that the plurality of holding chambers 10 is opened on a side opposed to the rotating plate 3 and arranged in a circumferential direction. Each of the holding chambers 10 is provided with one claw 11 meshing with the rotating plate 3. A base end 11*a* of each claw 11 is attached to the holding plate 2 via a spindle P rotatably around the axis Ax1 extending in a radial direction of the holding plate 2, and is biased by a spring 12 in a projection direction toward a rotating-plate-3 side. Hereby, each claw 11 can be operated between a state where each claw 11 is moved backward on a holding-plate-2 side and accommodated in the holding chamber 10 and a state where the each claw 11 projects from the holding plate 2 toward the rotating plate 3. That is, each claw 11 is provided in the holding plate 2 in a projectable state.

In the rotating plate 3, a plurality of recessed portions 15 is formed such that the plurality of recessed portions 15 is opened on a side opposed to the holding plate 2 and arranged in the circumferential direction. Each of the recessed portions 15 includes a wall 15*a* with which a tip end 11*b* of the claw 11 abuts at the time when the projecting claw 11 meshes therewith. Although not illustrated herein, the number of recessed portions 15 is larger than the number of claws 11. Further, a phase of each recessed portion 15 is different from a phase of each claw 11 (see FIG. 3). Accordingly, some of the plurality of projecting claws 11 mesh with some of the plurality of recessed portions 15.

A plurality of through holes 16 is formed in the selector plate 4 through which the claws 11 arranged in the circumferential direction and projecting can be partially passed with the same phases as the claws 11. A rotation position of the selector plate 4 can be switched between a released position in FIG. 2 and a locked position in FIG. 3. The released position is a position at which the tip end 11*b* of the claw 11 abuts with the selector plate 4 so as to restrict projection of the claw 11 and maintain the claw 11 to be accommodated on the holding-plate-2 side. The locked position is a position at which the claw 11 passes through the through hole 16 so that the claw 11 can mesh with the recessed portion 15 of the rotating plate 3. Hereby, the release mode and the lock mode are performed selectively.

In a case of the release mode in FIG. 2, the claws 11 are maintained to be accommodated on the holding-plate-2 side by the selector plate 4, so that the claws 11 do not reach the recessed portions 15 of the rotating plate 3. Accordingly, even if the rotation direction of the rotating plate 3 is either R1 or R2, torque transmission from the rotating plate 3 to the holding plate 2 is blocked, so that the rotating plate 3 is in a released state.

In a case of the lock mode in FIG. 3, at the time when the rotation direction of the rotating plate 3 is R1, the tip end 11*b* of the claw 11 abuts with the wall 15*a* of the recessed portion 15. Accordingly, the claw 11 meshes with the recessed portion 15 of the rotating plate 3, so that the holding plate 2 is joined to the rotating plate 3, thereby allowing torque transmission therebetween and fixing the rotating shaft 102. In the meantime, at the time when the rotation direction of the rotating plate 3 is R2, the claw 11 is inclined toward the direction of R2. Accordingly, even if the claw 11 interferes with the recessed portion 15 of the rotating plate 3, the claw 11 is just pushed back toward the holding-plate-2 side. On that account, the claw 11 does not mesh with the recessed portion 15. Accordingly, in a case of the lock mode in FIG. 3, at the time when the rotation direction of the rotating plate 3 is R2, torque transmission between the holding plate 2 and the rotating plate 3 is blocked and the rotating plate 3 is released.

The switch of a rotation position of the selector plate 4 is performed by a plate driving device 5A. As illustrated in FIGS. 1, 4 and FIGS. 5A to 5C, the plate driving device 5A includes: a drive arm 21 extending from the selector plate 4; an actuator 22 that outputs a driving force at the time of operation; a transmission mechanism 23 that transmits, to the drive arm 21, the driving force output from the actuator 22; a stopper 24 that restricts a rotation of the selector plate 4 from a released position to a locked position; and a release mechanism 25 that releases the restriction by the stopper 24 at the time of operation of the actuator 22.

The drive arm 21 is fixed to an outer peripheral portion of the selector plate 4, and extends outwardly in a radial direction of the selector plate 4 from a base end 30 placed in the outer peripheral portion to a tip end 31. The drive arm 21 is provided with an interference prevention portion 32 extending from the tip end 31 in a tangential direction (a right direction in the figure) of the selector plate 4. A function of the interference prevention portion 32 will be described later.

The actuator 22 is an electrically-driven actuator, for example, and outputs a driving force to drive the selector plate 4 via the drive arm 21 at the time of operation. The actuator 22 includes: a main body 33 fixed to a case 100; a drive rod 34 provided so as to penetrate through the main body 33 in a linearly movable state; and a return spring 35 provided between the main body 33 and a spring seat 34*a* placed in a rear end of the drive rod 34 so as to bias the drive rod 34 in a direction (the right direction in the figure) away from the drive arm 21.

The transmission mechanism 23 transmits, to the drive arm 21, a driving force output from the actuator 22, so as to rotate the selector plate 4 from the released position to the locked position. In view of this, the transmission mechanism 23 includes a transmission rod 36, a guide 37, a spring seat 38, and a return spring 39. The transmission rod 36 is placed on an extended line of the drive rod 34 of the actuator 22. The guide 37 is fixed to the case 100 and guides the transmission rod 36. The spring seat 38 is fixed to the transmission rod 36. The return spring 39 is provided between the guide 37 and the spring seat 38, and biases the transmission rod 36 in a direction (the right direction in the figure) approaching the actuator 22. The transmission rod 36 is linked to the drive arm 21 at a linkage position 36*a* set between the base end 30 and the tip end 31 of the drive arm 21. Hereby, an axial linear motion of the transmission rod 36 is transmitted to the drive arm 21 so as to be converted into a rotational motion of the selector plate 4. A gap G1 with a predetermined magnitude is set between the transmission rod 36 and the drive rod 34 of the actuator 22.

Figure 5A:
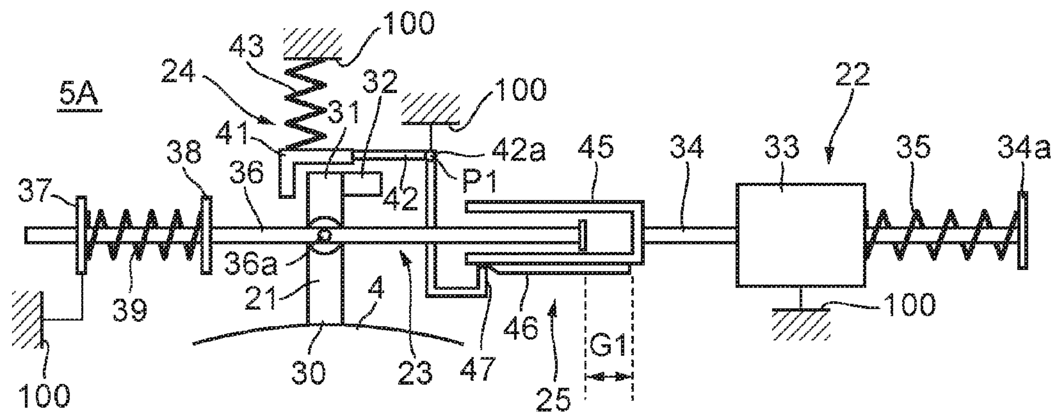
FIG. 5A is a view illustrating a state of the plate driving device according to the first embodiment at the time when a selector plate is placed at a released position and a stopper is placed at a restricted position.
Figure 5B:
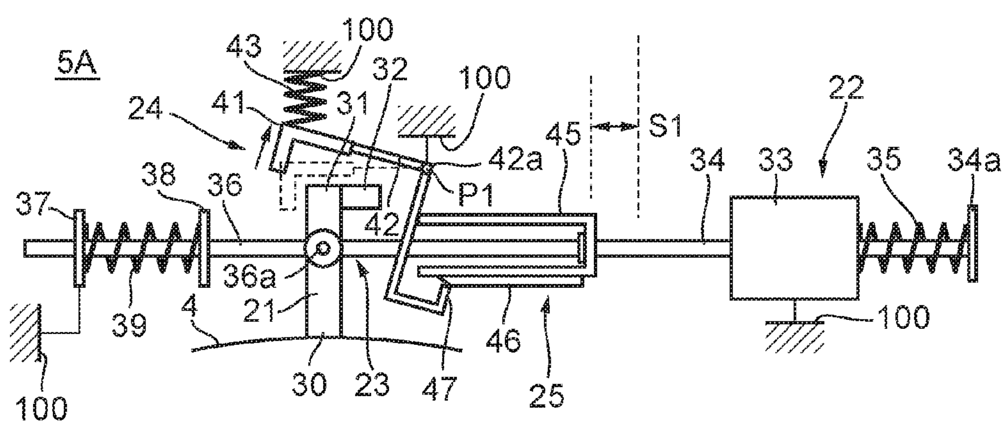
FIG. 5B is a view illustrating a state of the plate driving device according to the first embodiment at the time when the selector plate is placed at the released position and the stopper is placed at an unrestricted position.
Figure 5C:
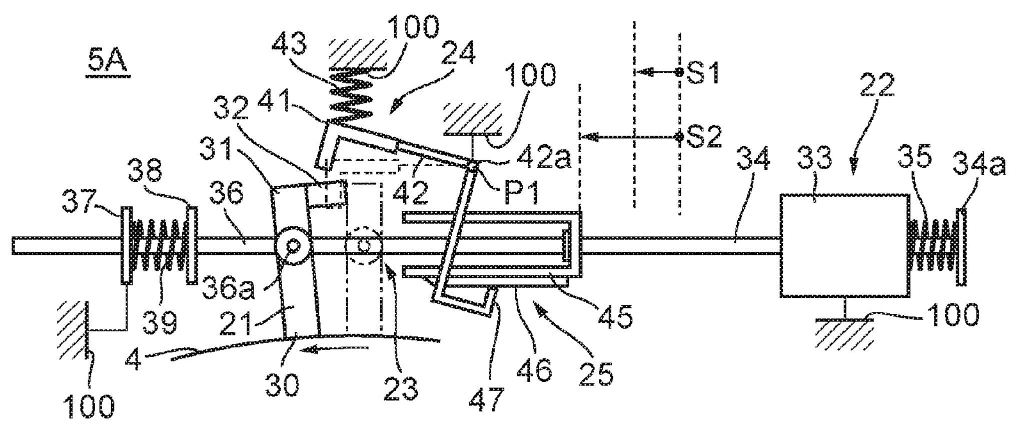
FIG. 5C is a view illustrating a state of the plate driving device according to the first embodiment at the time when the selector plate is placed at a locked position and a stopper is placed at the unrestricted position.
Figure 6:
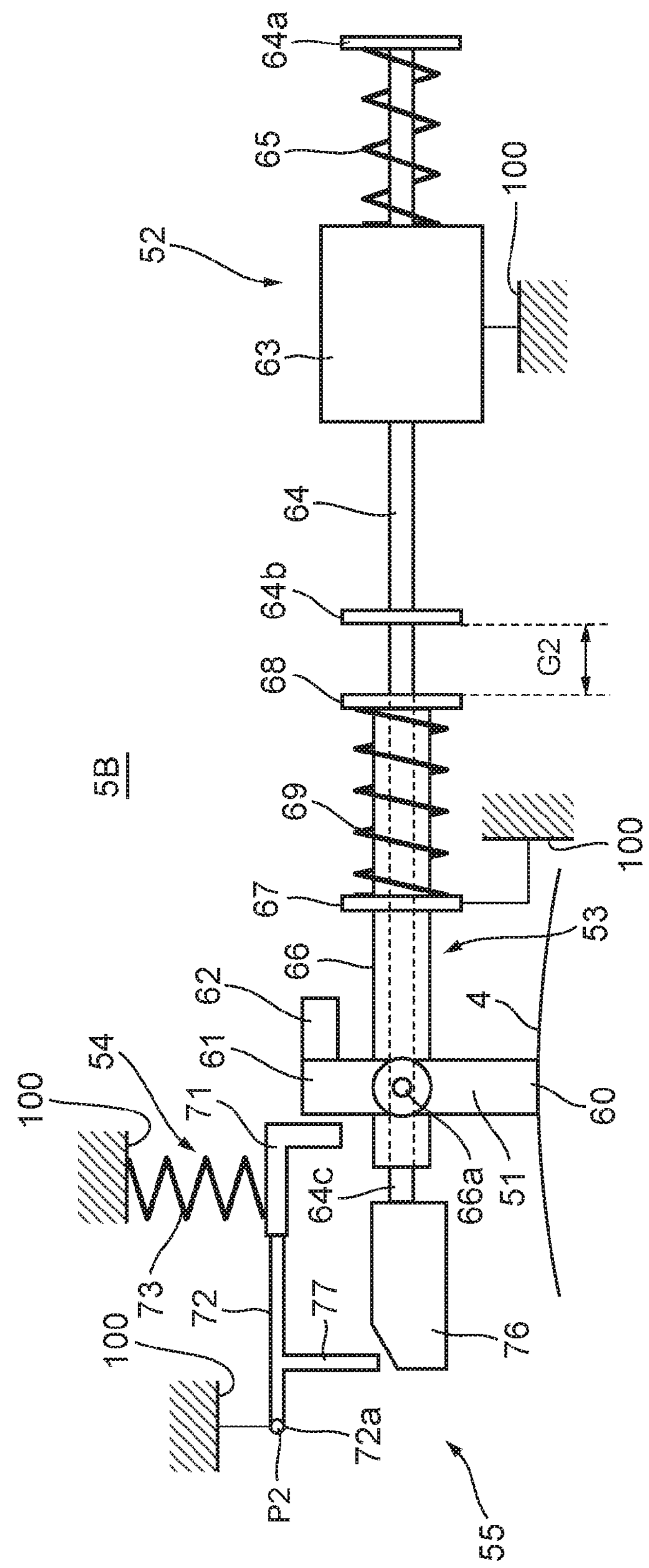
FIG. 6 is a view illustrating a plate driving device according to a second embodiment.

The stopper 24 is provided in an operable manner between a restricted position illustrated in FIG. 5A and an unrestricted position in FIGS. 5B and 5C. The stopper 24 includes a body portion 41, an extending portion 42, and a return spring 43. The body portion 41 is adjacent to the tip end 31 of the drive arm 21. The extending portion 42 extends from the body portion 41, and is provided so as to be rotatable relative to the case 100. The return spring 43 biases the stopper 24 in a direction where the stopper 24 is held at the restricted position, and one end thereof is fixed to the case 100. The body portion 41 is formed to have a generally L shape so that a corner of the L shape is opposed to a corner of the tip end 31 of the drive arm 21. The extending portion 42 extends from the body portion 41 in a direction parallel to the transmission rod 36 and then bends downward generally at a right angle, and a fulcrum P1 is set at a bent portion 42*a* thereof. A spindle (not shown) with the fulcrum P1 being taken as an axis is fixed to the case 100 so that the stopper 24 can rotate relative to the case 100 around the fulcrum P1.

The release mechanism 25 transmits, to the stopper 24, the driving force output from the actuator 22 at the time of operation, so as to move the stopper 24 from the restricted position to the unrestricted position. The release mechanism 25 includes an intervening member 45, a translational cam 46, and a cam follower 47. The intervening member 45 is placed between the drive rod 34 of the actuator 22 and the transmission rod 36 of the transmission mechanism 23, and is fixed to the drive rod 34. The translational cam 46 is fixed to the intervening member 45 and transmits a motion of the intervening member 45 to the extending portion 42 of the stopper 24. The cam follower 47 is provided in the extending portion 42 of the stopper 24 and follows the translational cam 46. In the present embodiment, a combination of the intervening member 45, the translational cam 46, and the cam follower 47 is one example of an intermediate mechanism.

When the clutch 1 is under an environment in which the clutch 1 is immersed in the gear oil, a torque of the rotating plate 3 is transmitted to the selector plate 4 via the gear oil. Particularly, in a case where a temperature of the gear oil is low, a viscosity of the gear oil becomes higher, so the clutch 1 is easily affected by the viscosity and a torque acting on the selector plate 4 is large. When the torque exceeds an elastic force of the return spring 39 at the time of non-operation of the actuator 22, the selector plate 4 is going to rotate in a direction from the released position toward the locked position against the elastic force of the return spring 39.

In the plate driving device 5A, at the time of non-operation of the actuator 22 illustrated in FIG. 5A, the selector plate 4 is placed at the released position, but the stopper 24 is placed at the restricted position. Accordingly, even if the selector plate 4 rotates in the direction from the released position toward the locked position against the elastic force of the return spring 39, the tip end 31 of the drive arm 21 fixed to the selector plate 4 abuts with the stopper 24. Thus, a rotation of the selector plate 4 from the released position to the locked position is restricted. This makes it possible to prevent a malfunction in which the selector plate 4 rotates unexpectedly from the released position to the locked position at the time of non-operation of the actuator 22 and the release mode is switched to the lock mode.

When the actuator 22 operates from the state of FIG. 5A, the drive rod 34 starts a stroke. Before the stroke of the drive rod 34 reaches a state of FIG. 5B in which the stroke reaches a stroke amount S1 corresponding to a gap G1, a driving force of the drive rod 34 is not transmitted to the transmission rod 36, and the driving force is transmitted to the stopper 24 via the intervening member 45, the translational cam 46, and the cam follower 47 of the release mechanism 25. Hereby, the stopper 24 rotates around the fulcrum P1 along a profile of the translational cam 46 against an elastic force of the return spring 43, and moves from the restricted position in FIG. 5A to the unrestricted position of FIG. 5B. Hereby, a rotational restriction of the selector plate 4 by the stopper 24 is released.

When the drive rod 34 makes a stroke to the state of FIG. 5B, the drive rod 34 abuts with the transmission rod 36, and the driving force of the actuator 22 is transmitted to the transmission rod 36. When the drive rod 34 further makes a stroke from the state of FIG. 5B, the transmission rod 36 starts displacement against the elastic force of the return spring 39, so that its linear motion is converted into a rotational motion of the selector plate 4 via the drive arm 21. When the stroke of the drive rod 34 reaches a stroke amount S2 illustrated in FIG. 5C, a rotation position of the selector plate 4 is switched to the locked position, so that the clutch 1 is switched to the lock mode.

Since the transmission mechanism 23 and the release mechanism 25 are configured as such, in a case where the operation of the actuator 22 is started from the state of FIG. 5A, the driving force of the actuator 22 is transmitted to the stopper 24 so that the stopper 24 moves to the unrestricted position, and then, the driving force of the actuator 22 is transmitted to the drive arm 21. On this account, at the time when the rotation of the selector plate 4 is started by the drive arm 21, the rotational restriction of the selector plate 4 by the stopper 24 is released in advance. Accordingly, it is possible to surely avoid such a situation that, at the time when the selector plate 4 is intentionally rotated from the released position to the locked position by the operation of the actuator 22, the stopper 24 disturbs the operation.

When the actuator 22 is switched to a non-operation state in a state illustrated in FIG. 5C, the state is returned to the state of FIG. 5A via the state of FIG. 5B due to respective elastic forces of the return springs 35, 39, 43. That is, the rotation position of the selector plate 4 is switched from the locked position to the released position, so that the clutch 1 is switched to the release mode.

In a course of returning to the state of FIG. 5A from the state of FIG. 5C, a timing at which the transmission rod 36 returns to its original position due to vibration or other reasons may be delayed from a timing at which the drive rod 34 returns to its original position. In this case, such a situation occurs that, though the drive arm 21 is placed at a position in FIG. 5C, the stopper 24 is going to move to the restricted position of FIG. 5A. Even if the stopper 24 is going to move to the restricted position in such a situation, the stopper 24 abuts with the interference prevention portion 32 provided in the drive arm 21. This makes it possible for the interference prevention portion 32 to prevent the stopper 24 from interfering with a moving range of the drive arm 21. Hereby, even if the above situation occurs in a course of returning to the state of FIG. 5A from the state of FIG. 5C, it is possible to prevent such an inconvenience that the stopper 24 interferes with the moving range of the drive arm 21 and the stopper 24 gets caught in the drive arm 21.

Since the clutch 1 of the present embodiment is provided with the plate driving device 5A, it is possible to obtain the above effects. Further, since the clutch 1 operates each of the selector plate 4 and the stopper 24 by means of the common actuator 22, it is possible to reduce the number of actuators in comparison with a case where different actuators for these operations are prepared separately, and it is also possible to reduce a drive energy for driving the actuator.

Next will be described a second embodiment with reference to FIG. 6 and FIGS. 7A to 7C. A selectable one-way clutch of the second embodiment corresponds to a selectable one-way clutch in which the plate driving device 5A in the first embodiment is replaced with a plate driving device 5B. Hereinafter, a detailed description of a common configuration to the first embodiment is omitted, and a configuration and an operation of the plate driving device 5B according to the second embodiment are described with reference to the above drawings.

As illustrated in FIG. 6 and FIGS. 7A to 7C, the plate driving device 5B includes a drive arm 51, an actuator 52, a transmission mechanism 53, a stopper 54, and a release mechanism 55. The drive arm 51 extends from a selector plate 4. The actuator 52 outputs a driving force at the time of operation. The transmission mechanism 53 transmits, to the drive arm 51, the driving force output from the actuator 52. The stopper 54 restricts a rotation of the selector plate 4 from a released position to a locked position. The release mechanism 55 releases the restriction by the stopper 54 at the time of operation of the actuator 52.

The drive arm 51 is fixed to an outer peripheral portion of the selector plate 4, and extends outwardly in a radial direction of the selector plate 4 from a base end 60 placed in the outer peripheral portion, toward a tip end 61. The drive arm 51 is provided with an interference prevention portion 62 extending from the tip end 61 in a tangential direction (a right direction in the figure) of the selector plate 4.

The actuator 52 is an electrically-driven actuator, for example, and outputs a driving force to drive the selector plate 4 via the drive arm 51 at the time of operation. The actuator 52 includes: a main body 63 fixed to a case 100; a drive rod 64 provided so as to penetrate through the main body 63 in a linearly movable state; and a return spring 65 provided between the main body 63 and a spring seat **64*a* placed in a rear end of the drive rod 64 so as to bias the drive rod 64 in a direction (the right direction in the figure) away from the drive arm 51**.

The transmission mechanism 53 transmits, to the drive arm 51, a driving force output from the actuator 52, so as to rotate the selector plate 4 from the released position to the locked position. On this account, the transmission mechanism 53 includes: a hollow transmission rod 66 placed coaxially with as the drive rod 64 in a state where the drive rod 64 of the actuator 52 is inserted therein; a guide 67 fixed to the case 100 so as to guide the transmission rod 66; a spring seat 68 fixed to the transmission rod 66; and a return spring 69 placed between the guide 67 and the spring seat 68. The transmission rod 66 is linked to the drive arm 51 at a linkage position **66*a* set between the base end 60 and the tip end 61 of the drive arm 51. Hereby, an axial linear motion of the transmission rod 66 is transmitted to the drive arm 51 so as to be converted into a rotational motion of the selector plate 4. The drive rod 64 inserted into the transmission rod 66 is provided with a flange portion 64*b* which expands radially outwardly and with which the transmission rod 66 can abut, and a gap G2 having a predetermined magnitude is set between the flange portion 64*b* and the transmission rod 66**.

Figure 7A:
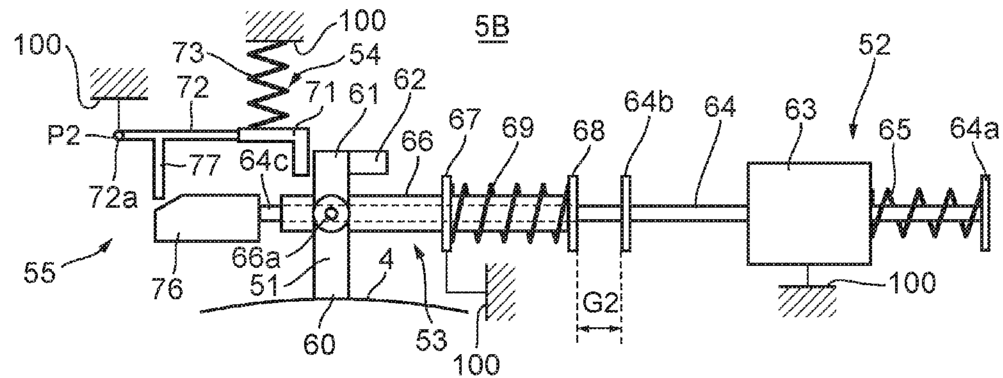
FIG. 7A is a view illustrating a state of the plate driving device according to the second embodiment at the time when a selector plate is placed at a released position and a stopper is placed at a restricted position.
Figure 7B:
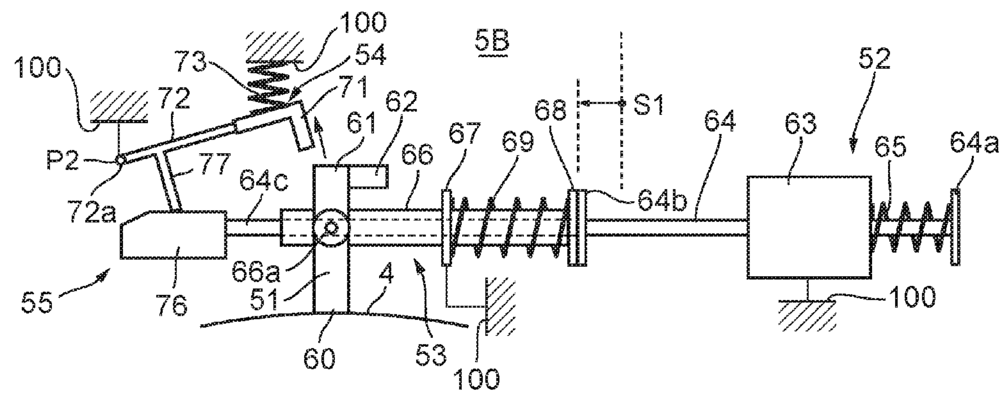
FIG. 7B is a view illustrating a state of the plate driving device according to the second embodiment at the time when the selector plate is placed at the released position and the stopper is placed at an unrestricted position.
Figure 7C:
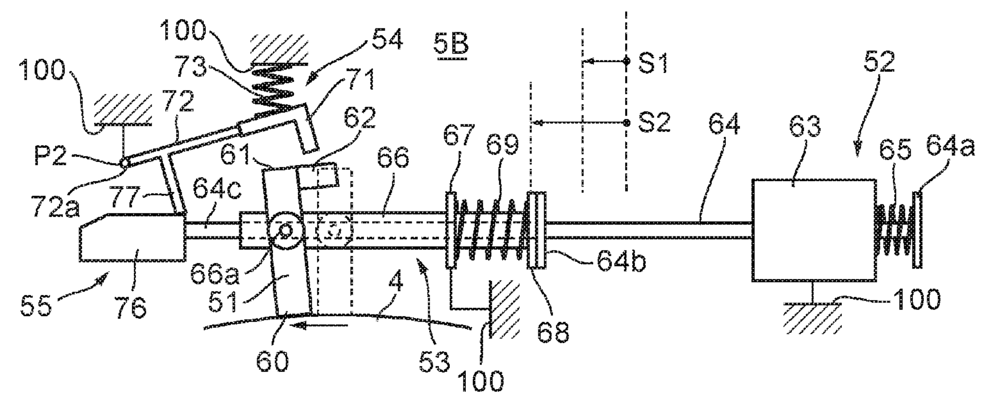
FIG. 7C is a view illustrating a state of the plate driving device according to the second embodiment at the time when the selector plate is placed at a locked position and the stopper is placed at the unrestricted position.

The stopper 54 is provided in an operable manner between a restricted position illustrated in FIG. 7A and an unrestricted position illustrated in FIGS. 7B and 7C. The stopper 54 includes: a body portion 71 adjacent to the tip end 61 of the drive arm 51; an extending portion 72 extending from the body portion 71 and provided so as to be rotatable relative to the case 100; and a return spring 73 biasing the stopper 54 in a direction where the stopper 54 is held at the restricted position and having one end fixed to the case 100. The body portion 71 is formed to have a generally L shape so that a tip end of the L shape is opposed to the tip end 61 of the drive arm 51. The extending portion 72 extends from the body portion 71 in a direction parallel to each of the transmission rod 66 and the drive rod 64, and a fulcrum P2 is set at an end portion **72*a* of the extending portion 72. A spindle (not shown) with the fulcrum P2 being taken as an axis is fixed to the case 100 so that the stopper 54 can rotate relative to the case 100 around the fulcrum P2**.

The release mechanism 55 transmits, to the stopper 54, the driving force output from the actuator 52 at the time of operation, so as to move the stopper 54 from the restricted position to the unrestricted position. On this account, the release mechanism 55 includes: a translational cam 76 fixed to a tip end **64*c* of the drive rod 64 exposed from the transmission rod 66 of the transmission mechanism 53; and a cam follower 77 extending downward from the extending portion 72 of the stopper 54 so as to follow the translational cam 76. In the present embodiment, a combination of the translational cam 76 and the cam follower 77** is one example of an intermediate mechanism.

The plate driving device 5B operates similarly to the plate driving device 5A of the first embodiment. That is, in the plate driving device 5B, at the time of non-operation of the actuator 52 illustrated in FIG. 7A, the selector plate 4 is placed at the released position, but the stopper 54 is placed at the restricted position. Accordingly, even if the selector plate 4 rotates in a direction from the released position toward the locked position against the elastic force of the return spring 69 due to an influence of a viscosity of gear oil, the tip end 61 of the drive arm 51 fixed to the selector plate 4 abuts with the stopper 54, so that a rotation of the selector plate 4 from the released position to the locked position is restricted. This makes it possible to prevent a malfunction in which the selector plate 4 rotates unexpectedly from the released position to the locked position at the time of non-operation of the actuator 52 and the release mode is switched to the lock mode.

When the actuator 52 operates from the state of FIG. 7A, the drive rod 64 starts a stroke. Before the stroke of the drive rod 64 reaches a state of FIG. 7B in which the stroke reaches a stroke amount S1 corresponding to a gap G2, a driving force of the drive rod 64 is not transmitted to the transmission rod 66, and the driving force is transmitted to the stopper 54 via the translational cam 76 and the cam follower 77 of the release mechanism 55. Hereby, the stopper 54 rotates around the fulcrum P2 along a profile of the translational cam 76 against an elastic force of the return spring 73, and moves from the restricted position in FIG. 7A to the unrestricted position of FIG. 7B. Hereby, a rotational restriction of the selector plate 4 by the stopper 54 is released.

When the drive rod 64 makes a stroke to the state of FIG. 7B, the flange portion **64*b* of the drive rod 64 abuts with the transmission rod 66, and the driving force of the actuator 52 is transmitted to the transmission rod 66. When the drive rod 64 further makes a stroke from the state of FIG. 7B, the transmission rod 66 starts displacement against an elastic force of the return spring 69, so that its linear motion is converted into a rotational motion of the selector plate 4 via the drive arm 51. When the stroke of the drive rod 64 reaches a stroke amount S2 illustrated in FIG. 7C, a rotation position of the selector plate 4 is switched to the locked position, so that the clutch 1** is switched to the lock mode.

Similarly to the plate driving device 5A of the first embodiment, in the plate driving device 5B, in a case where the operation of the actuator 52 is started from the state of FIG. 7A, the driving force of the actuator 52 is transmitted to the stopper 54 so that the stopper 54 moves to the unrestricted position, and then, the driving force of the actuator 52 is transmitted to the drive arm 51. On this account, at the time when the rotation of the selector plate 4 is started by the drive arm 51, the rotational restriction of the selector plate 4 by the stopper 54 is released in advance. Accordingly, it is possible to surely avoid such a situation that, at the time when the selector plate 4 is intentionally rotated from the released position to the locked position by the operation of the actuator 52, the stopper 54 disturbs the operation.

When the actuator 52 is switched to a non-operation state in a state illustrated in FIG. 7C, the state is returned to the state of FIG. 7A via the state of FIG. 7B due to respective elastic forces of the return springs 65, 69, 73, similarly to the plate driving device 5A of the first embodiment. That is, the rotation position of the selector plate 4 is switched from the locked position to the released position, so that the clutch 1 is switched to the release mode.

In a course of returning to the state of FIG. 7A from the state of FIG. 7C, even if such a situation occurs that the stopper 54 is going to move to the restricted position of FIG. 7A though the drive arm 51 is placed at the position in FIG. 7C, the stopper 54 is prevented, by the interference prevention portion 62, from interfering with a moving range of the drive arm 51, similarly to the first embodiment. Accordingly, it is possible to prevent such an inconvenience that the stopper 54 interferes with the moving range of the drive arm 51 in the course of returning to the state of FIG. 7A from the state of FIG. 7C and the stopper 54 gets caught in the drive arm 51.

Since the clutch 1 of the present embodiment is provided with the plate driving device 5B, it is possible to obtain the above effects. Further, since the clutch 1 operates each of the selector plate 4 and the stopper 54 by means of the common actuator 52, it is possible to reduce the number of actuators in comparison with a case where different actuators for these operations are prepared separately, and it is also possible to reduce a drive energy for driving the actuator.

The embodiments are not limited to the above, and can be performed with various modifications. In each of the embodiments, the drive arm extends outwardly in the radial direction of the selector plate, but a direction where the drive arm extends is not limited to a direction directed outwardly in the radial direction. For example, in a case where each plate constituting the clutch has a hollow discoid shape, the drive arm may be provided to extend radially inwardly, that is, toward a center of the selector plate, from an inner periphery of the selector plate, and a plate driving device and the like may be placed in a hollow portion of each plate.

In each of the embodiments, the rotation of the selector plate is restricted by the stopper abutting with the drive arm. On this account, there is such an advantage that a degree of freedom of the arrangement of each constituent improves because the transmission mechanism, the stopper, the release mechanism, and the like can be placed on an outer peripheral side of the selector plate. However, the configuration of the stopper and the drive arm in each of the above embodiments is merely one example. For example, a receiving portion such as a projection or a groove may be provided in the selector plate, so that the receiving portion abuts with the stopper so as to restrict the rotation of the selector plate.

In each of the embodiments, a gap is set between the transmission rod of the transmission mechanism and the drive rod of the actuator so that a driving force of the actuator is transmitted to the drive arm after the driving force is transmitted to the stopper. However, the setting of such a gap is optional, and such a gap may not be set, and the driving force of the actuator may be transmitted to the stopper and the drive arm at the same time so that the stopper starts its operation in conjunction with the start of the operation of the drive arm.

What is claimed is:

1. A selectable one-way clutch comprising:
- a first plate having an axis orthogonal to a surface of said first plate;
- a second plate having an axis orthogonal to a surface of said second plate such that said second plate is placed relative to the first plate so that the axis of the second plate coincides with the axis of the first plate;
- a claw configured to project from the first plate toward the second plate, the claw being provided in the first plate, the claw being configured to:
  - mesh with a recessed portion in the second plate when the claw projects from the first plate and when the second plate rotates in one predetermined direction, and
  - not mesh with the recessed portion in the second plate when the claw projects from the first plate and when the second plate rotates in an opposite direction from the one predetermined direction;
- a selector plate placed adjacent to the first plate, the selector plate being configured to rotate relative to the first plate between a locked position at which the claw projects from the first plate and a released position at which the claw is maintained to be accommodated on a first-plate-side; and
- a plate driving device configured to rotationally drive the selector plate, the plate driving device including a drive arm, an actuator, a transmission mechanism, a stopper, and a release mechanism,
- the drive arm extending from the selector plate,
- the actuator being configured to output a driving force to drive the selector plate via the drive arm at a time of operation,
- the transmission mechanism being configured to transmit, to the drive arm, the driving force output from the actuator, such that the selector plate rotates from the released position to the locked position,
- the stopper being configured to move between a restricted position at which a rotation of the selector plate from the released position to the locked position is restricted and an unrestricted position at which the restriction is released, the stopper being placed at the restricted position at a time of non-operation of the actuator,
- the release mechanism being configured to transmit, to the stopper, the driving force output at the time of operation of the actuator such that the stopper moves from the restricted position to the unrestricted position.

2. The selectable one-way clutch according to claim 1, wherein
- the drive arm extends radially outwardly from the selector plate; and
- the stopper is configured to abut with the drive arm when the selector plate rotates in a direction from the released position toward the locked position and the stopper is positioned at the restricted position.

3. The selectable one-way clutch according to claim 2, further comprising an interference prevention portion provided in the drive arm, the interference prevention portion being configured to prevent the stopper from interfering with a moving range of the drive arm when the stopper moves from the unrestricted position to the restricted position.

4. The selectable one-way clutch according claim 1, wherein the transmission mechanism and the release mechanism are each configured such that, when the operation of the actuator starts to operate, the driving force is transmitted to the stopper so that the stopper moves to the unrestricted position, and then, the driving force is transmitted to the drive arm such that the drive arm operates.

5. The selectable one-way clutch according to claim 4, wherein:
- the actuator includes a drive rod, the drive rod is configured to transmit the driving force;
- the transmission mechanism is placed on an extended line of the drive rod via a gap;

the transmission mechanism includes a transmission rod, the transmission rod is configured to abut with the drive rod when the drive rod makes a stroke by an amount equal to the gap, such that the transmission rod transmits the driving force to the drive arm; and the release mechanism includes an intermediate mechanism, the intermediate mechanism is provided between the drive rod and the stopper, the intermediate mechanism is configured to transmit the driving force to the stopper when the drive rod makes the stroke.

* * * * *